United States Patent
Xu et al.

(10) Patent No.: US 8,791,823 B2
(45) Date of Patent: Jul. 29, 2014

(54) AIRCRAFT PART CONTROL SYSTEM

(75) Inventors: Alekzander Hao Xu, Seattle, WA (US); Winfeng Li, Renton, WA (US); Arun Ayyagari, Seattle, WA (US); Anil Kumar, Sammamish, WA (US); David B. Blackwell, Seattle, WA (US); Kevin Yong Ung, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 409 days.

(21) Appl. No.: 13/152,806

(22) Filed: Jun. 3, 2011

(65) Prior Publication Data

US 2012/0306666 A1 Dec. 6, 2012

(51) Int. Cl.
*G08B 13/14* (2006.01)

(52) U.S. Cl.
USPC .......... 340/572.1; 340/5.92; 340/691.6; 705/28

(58) Field of Classification Search
USPC .......... 340/572.1, 10.1, 5.92, 691.6; 705/28, 705/305; 700/213, 215
See application file for complete search history.

(56) References Cited

U.S. PATENT DOCUMENTS

| | | | |
|---|---|---|---|
| 5,959,568 A | 9/1999 | Woolley | |
| 6,043,746 A | 3/2000 | Sorrells | |
| 6,381,541 B1 | 4/2002 | Sadler | |
| 6,611,198 B1 | 8/2003 | Geiszler et al. | |
| 6,799,187 B2 * | 9/2004 | Beggs et al. | 1/1 |
| 6,812,841 B2 | 11/2004 | Heinrich et al. | |
| 6,842,121 B1 | 1/2005 | Tuttle | |
| 6,965,816 B2 | 11/2005 | Walker | |
| 6,995,655 B2 | 2/2006 | Ertin et al. | |
| 7,030,760 B1 | 4/2006 | Brown | |
| 7,047,159 B2 | 5/2006 | Muehl et al. | |
| 7,064,668 B2 | 6/2006 | Porad | |
| 7,545,274 B2 | 6/2009 | Coop | |
| 7,546,176 B2 * | 6/2009 | Botvinnik et al. | 700/106 |
| 7,551,086 B2 | 6/2009 | Coop et al. | |
| 7,589,636 B2 | 9/2009 | Ayyagari et al. | |
| 7,696,751 B2 | 4/2010 | Molyneaux et al. | |
| 7,698,148 B2 | 4/2010 | Lavu et al. | |
| 7,855,643 B2 | 12/2010 | Tuttle | |
| 8,026,631 B2 | 9/2011 | Stoner et al. | |
| 8,081,080 B2 | 12/2011 | Henriot et al. | |
| 8,097,836 B2 | 1/2012 | Raterman | |

(Continued)

FOREIGN PATENT DOCUMENTS

| | | |
|---|---|---|
| CN | 101226602 A | 7/2008 |
| CN | 101226603 A | 7/2008 |
| WO | WO2012078234 A1 | 6/2012 |

OTHER PUBLICATIONS

Non-final office action dated Feb. 25, 2013 regarding U.S. Appl. No. 12/964,048, 16 pages.

(Continued)

*Primary Examiner* — Thomas Mullen
(74) *Attorney, Agent, or Firm* — Yee & Associates, P.C.

(57) ABSTRACT

A method and apparatus for managing parts. Location information is displayed for a part on an aircraft on a mobile device. A determination is made as to whether the part is present in a location using a sensor system in the mobile device when the mobile device is in a zone including the location. A presence of the part in the location is indicated in response to the part being present in the location.

16 Claims, 13 Drawing Sheets

(56) References Cited

U.S. PATENT DOCUMENTS

| | | |
|---|---|---|
| 8,209,300 B2 | 6/2012 | Malkowicz et al. |
| 8,231,062 B1 | 7/2012 | Ayyagari et al. |
| 8,380,385 B2 | 2/2013 | Yukawa et al. |
| 2004/0020994 A1* | 2/2004 | Muehl et al. ............... 701/29 |
| 2005/0044180 A1 | 2/2005 | Lamers et al. |
| 2005/0288947 A1 | 12/2005 | Mallonee et al. |
| 2006/0086790 A1 | 4/2006 | Sloan et al. |
| 2006/0144997 A1 | 7/2006 | Schmidt et al. |
| 2007/0063847 A1* | 3/2007 | Lee et al. ............... 340/572.1 |
| 2007/0114280 A1* | 5/2007 | Coop et al. ............ 340/572.1 |
| 2007/0156496 A1* | 7/2007 | Avery et al. ................. 705/8 |
| 2007/0241908 A1* | 10/2007 | Coop ................... 340/572.8 |
| 2007/0266782 A1* | 11/2007 | Bartz et al. .................. 701/32 |
| 2007/0290803 A1 | 12/2007 | Ayyagari et al. |
| 2008/0186138 A1 | 8/2008 | Butler et al. |
| 2009/0132595 A1 | 5/2009 | Yang et al. |
| 2009/0322488 A1 | 12/2009 | Kanagala et al. |
| 2009/0322551 A1 | 12/2009 | Kanagala et al. |
| 2010/0079237 A1 | 4/2010 | Falk et al. |
| 2010/0102934 A1 | 4/2010 | Guichard |
| 2010/0156606 A1 | 6/2010 | Gold |
| 2010/0156650 A1 | 6/2010 | Stern |
| 2012/0026016 A1 | 2/2012 | Mitchell et al. |
| 2012/0044092 A1 | 2/2012 | Shore et al. |
| 2012/0146815 A1 | 6/2012 | Yourkowski et al. |

OTHER PUBLICATIONS

PCT search report dated Feb. 13, 2012 regarding application PCT/US11/53363, filing date Sep. 27, 2011, applicant The Boeing Company, 8 pages.

Final office action dated Feb. 6, 2014 regarding U.S. Appl. No. 12/964,048, 18 pages.

Notice of Allowance dated Apr. 25, 2014, regarding U.S. Appl. No 12/964,048, 11 pages.

* cited by examiner

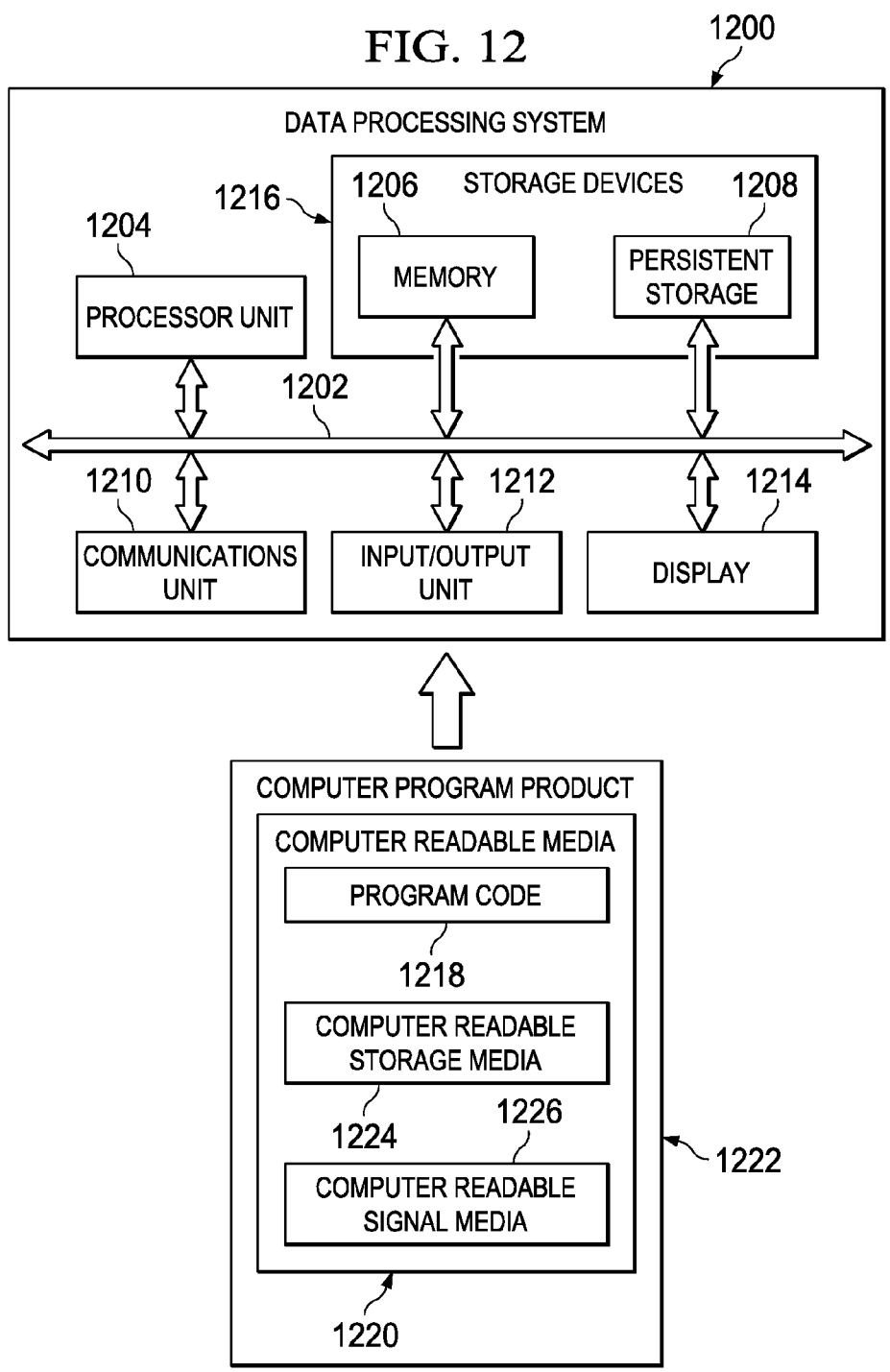

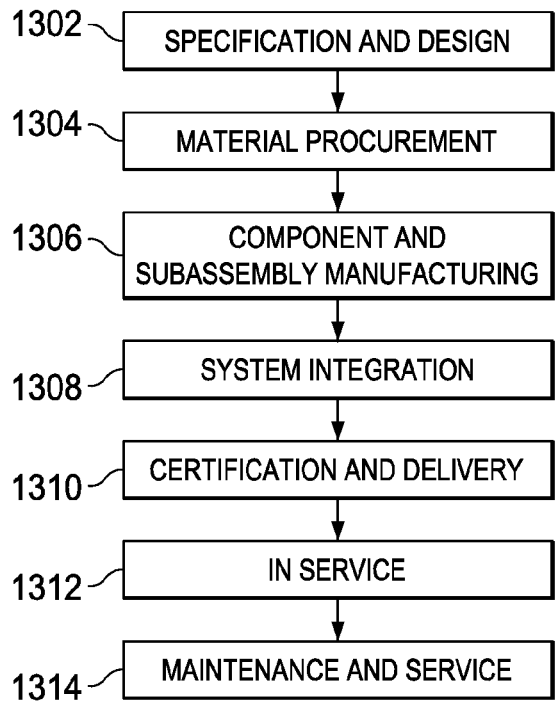
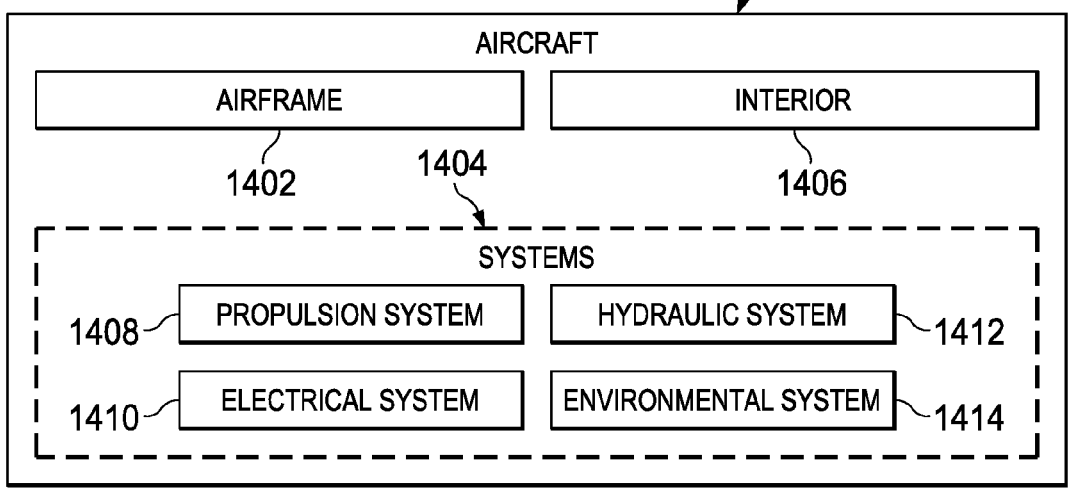

AIRCRAFT PART CONTROL SYSTEM

BACKGROUND INFORMATION

1. Field

The present invention relates generally to aircraft and, in particular, to managing aircraft parts. Still more particularly, the present disclosure relates to a method and apparatus for confirming configurations of parts in an aircraft.

2. Background

Manufacturing aircraft for delivery to customers involves different phases. For example, before the aircraft is manufactured, designs are generated for the aircraft. These designs may include designs for the airframe, engine, fuel system, entertainment system, and other suitable systems or assemblies in the aircraft.

After the design is completed, components are manufactured or procured. These parts are put together to form the aircraft. The parts are often identified and assembled to form these different systems using a model. This model may be for a particular system or the entire aircraft. The models may be two-dimensional or three-dimensional models. These models may be, for example, computer aided design (CAD) models.

The personnel that assemble the aircraft may use information in these models to put together parts to form structures for the aircraft. The personnel may display these portions or all of these models on a display device or print them out on paper. Assembling the different parts for the aircraft structure, as identified in the model, is performed to manufacture a structure with a desired level of performance.

If a different part is used other than the one specified by the model, then the particular structure may not perform as desired. After parts are assembled to form a structure for the aircraft, these parts may be inspected to ensure that the parts specified in the models are used in the structure.

Currently, inspectors perform inspections to verify whether the correct parts are in the correct locations. An inspector may have a list of parts for inspection. The inspector moves to a particular location where the part is expected to be found and visually looks for that part. If the part is found at the location, a confirmation is entered. If the part is absent, the inspector makes an entry indicating that an incorrect part is at the location.

An inspector may have a list of parts and their locations assigned to the inspector for verification. These locations make take the form of three-dimensional coordinates. The coordinates may be x y z coordinates with a reference location on the aircraft. The inspector goes to the particular location based on these coordinates and looks for the part. Currently, the inspector may look for a serial number or bar code that is on a plate or some other visual identifier attached to the part.

This type of process may take more time than desired. Further, this type of process also may take even more time with less experienced inspectors.

For example, an experienced inspector may be able to find the location quickly based on previous inspections with the type of aircraft. If the inspector begins inspections with a different type of aircraft or if the inspector is inexperienced, then the amount of time needed to find the location for the part may be more than desired.

Therefore, it would be advantageous to have a method and apparatus that takes into account at least some of the issues discussed above, as well as possibly others.

SUMMARY

In one advantageous embodiment, a method for managing parts is provided. Location information is displayed for a part on an aircraft on a mobile device. A determination is made as to whether the part is present in a location using a sensor system in the mobile device when the mobile device is in a zone including the location. A presence of the part in the location is indicated in response to the part being present in the location.

In another advantageous embodiment, an apparatus comprises a mobile device. The mobile device is configured to display location information for a part on an aircraft on a mobile device. The mobile device is further configured to determine whether the part is present in a location using a sensor system in the mobile device when the mobile device is in a zone including the location. Further, the mobile device is configured to indicate a presence of the part in the location in response to the part being present in the location.

The features, functions, and advantages can be achieved independently in various embodiments of the present invention or may be combined in yet other embodiments in which further details can be seen with reference to the following description and drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an advantageous embodiment of the present invention when read in conjunction with the accompanying drawings, wherein:

FIG. 12 is an illustration of a data processing system in accordance with an advantageous embodiment;

FIG. 13 is an illustration of an aircraft manufacturing and service method in accordance with an advantageous embodiment; and FIG. 14 is an illustration of an aircraft in which an advantageous embodiment may be implemented.

DETAILED DESCRIPTION

Figure 1:
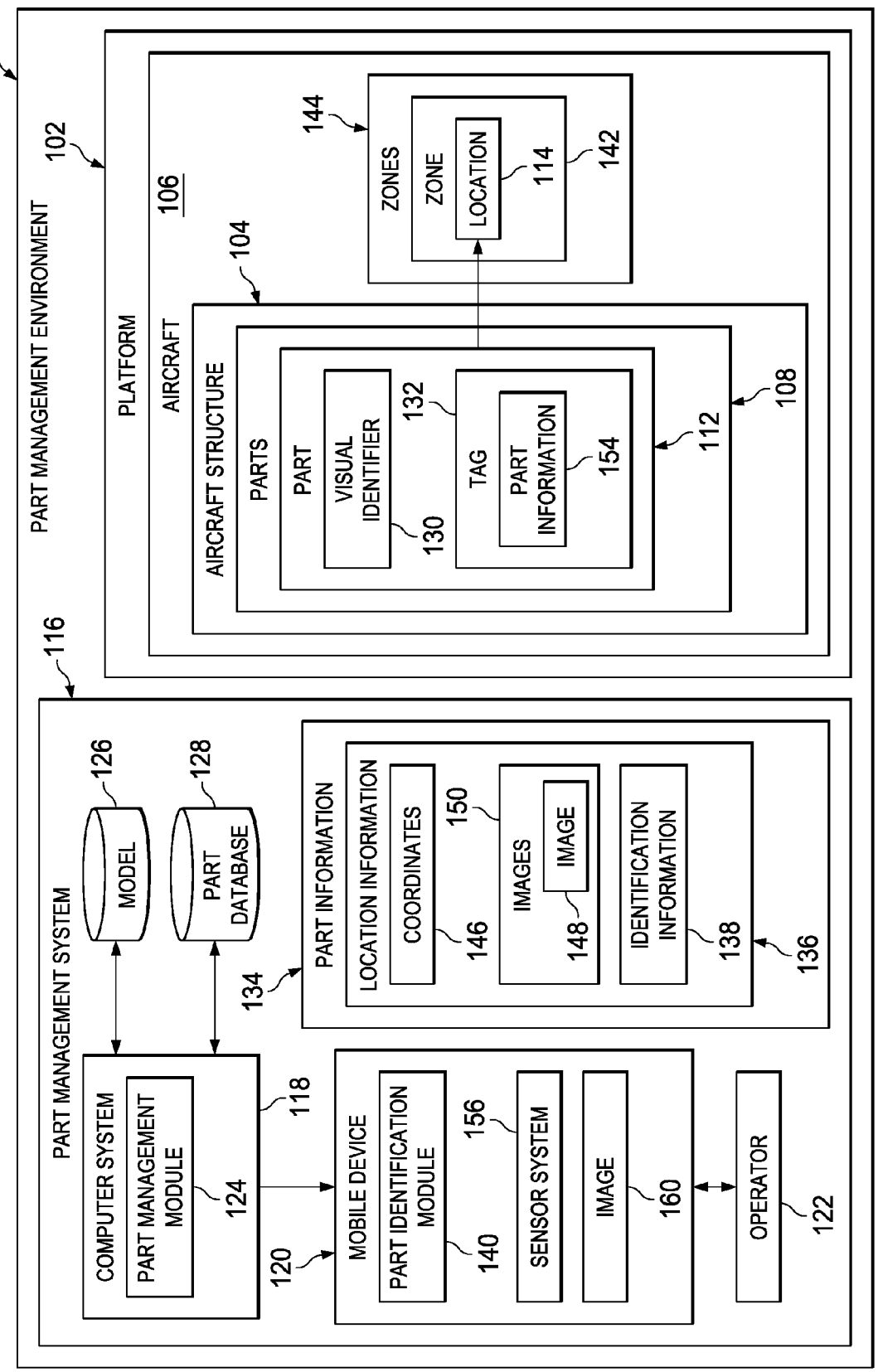
FIG. 1 is an illustration of a part management environment in accordance with an advantageous embodiment.

The different advantageous embodiments recognize and take into account a number of different considerations. "A number", as used herein with reference to items, means one or more items. For example, "a number of considerations" may be one or more considerations.

In these illustrative examples, the different advantageous embodiments recognize and take into account that one manner in which the current visual inspection process may be improved may involve associating parts with tags that may be read by a device without requiring the device to be able to see the tag. For example, the tag may be a radio frequency identification (RFID) tag. Of course, any type of tag that is configured to generate wireless signals providing information about the part associated with the tag may be used.

Although the use of radio frequency identification tags allow for identifying parts without having to see an identifier on the part, the different advantageous embodiments recognize and take into account that the presence of the part may be detected; however, the location of the part in the structure still needs to be confirmed. Further, the different advantageous embodiments also recognize and take into account that multiple tags may be present in the area. As a result, the inspector may still need to locate the part before obtaining information about the part from the radio frequency identification tag.

The different advantageous embodiments recognize and take into account that the use of radio frequency identification (RFID) tags may reduce the time needed to enter information about the part. The different advantageous embodiments also recognize and take into account that with the use of radio frequency identification tags, errors in data entry also may be reduced.

The different advantageous embodiments also recognize and take into account that even with experienced inspectors, finding the location of the part with respect to other parts in a structure and other conditions may increase the time and effort needed to verify the location of parts.

Further, with visual inspections, the different advantageous embodiments recognize and take into account that discrepancies may be present in the entered information as compared to the information regarding the expected locations for parts. As a result, subsequent inspections may be needed to verify whether the discrepancy indicates that a part is actually not in the correct place or if an error in entry occurred.

Thus, the different advantageous embodiments provide a method and apparatus for managing parts. In particular, the different advantageous embodiments provide a method and apparatus for confirming the location of parts in an aircraft.

In one advantageous embodiment, location information for a part on an aircraft is displayed on a mobile device. A determination is made as to whether the part is present in the location with a sensor system in the mobile device when the mobile device is in a zone including the location. Responsive to a part being present in the location, a presence of the part in the location is indicated.

With reference now to the figures and, in particular, with reference to FIG. 1, an illustration of a part management environment is depicted in accordance with an advantageous embodiment. In this illustrative example, part management environment 100 comprises platform 102. In this illustrative example, platform 102 is aircraft structure 104 for aircraft 106. Aircraft structure 104 may be a portion or all of aircraft 106, depending on the extent to which aircraft 106 has been completed. Further, aircraft structure 104 may be all of aircraft 106 during reconfiguration or upgrading of aircraft 106.

In these illustrative examples, parts 108 are assembled to form aircraft structure 104. An inspection may be performed to verify that part 112 is in location 114 in aircraft structure 104. This verification may be to verify that a part in location 114 is part 112 and not some other part.

In these illustrative examples, the inspection may be performed using part management system 116. In this illustrative example, part management system 116 comprises computer system 118 and mobile device 120. Computer system 118 includes a number of computers. These computers may be in communication with each other.

Mobile device 120, in this illustrative example, may be carried by operator 122 and moved with respect to aircraft structure 104. In these illustrative examples, mobile device 120 is a device that is configured to be moved by operator 122.

In particular, mobile device 120 may be a handheld mobile device. As a handheld mobile device, operator 122 may be able to carry mobile device 120 in one hand. Part management module 124 is located in computer system 118. In these illustrative examples, part management module 124 may access model 126 and part database 128.

Model 126 is a model of aircraft structure 104 in these illustrative examples. Model 126 also may take the form of a portion of aircraft structure 104 in which part 112 is located. Model 126 may be a two-dimensional or three-dimensional model, depending on the particular implementation.

Part database 128 contains information about parts 108. In particular, part database 128 may contain information about part 112 and its desired location, location 114 in aircraft structure 104. Information in part database 128 may be indexed or corresponded to parts identified in model 126.

The information in part database 128 includes information used to identify part 112 in location 114. For example, this information may include a part number and serial number. This information may be found visually in visual identifier 130 from tag 132 or some combination thereof. Visual identifier 130 and tag 132 are associated with part 112 in this illustrative example.

A first component may be considered to be associated with a second component by being secured to the second component, bonded to the second component, welded to the second component, fastened to the second component, and/or connected to the second component in some other suitable manner. The first component also may be connected to the second component using a third component. The first component may also be considered to be associated with the second component by being formed as part of and/or an extension of the second component.

In these illustrative examples, part management module 124 may generate part information 134 about parts 108. Part management module 124 may be hardware, software, or a combination of the two in computer system 118.

Part information 134 comprises any information needed to locate part 112 in location 114. In other words, part information 134 may be used as information to verify that a part at location 114 is part 112 and not some other part.

For example, part information 134 includes location information 136 and identification information 138 in these examples. Location information 136 is any information that may be used to identify location 114 for part 112.

Identification information 138 is any information that may be used to verify the identity of part 112 once location 114 is found. In other words, part information 134 may be used to determine whether the correct part is in location 114.

In these illustrative examples, part information 134 may be arranged in a number of different ways. For example, part information 134 may include a list of parts within parts 108 that are to be inspected by operator 122. The list may then be selected to obtain additional information needed to find the parts in aircraft structure 104. In this illustrative example, part information 134 includes information for part 112. In other examples, part information 134 may include information for other parts.

Part information 134 may be sent to mobile device 120. In particular, part identification module 140 in mobile device 120 may receive part information 134. Part identification module 140 may be implemented using hardware, software, or a combination of the two.

In these illustrative examples, part information 134 may be sent in a number of different ways. For example, wireless communication links, network connections, wired links, and other suitable types of communication may be used to transfer part information 134 to part identification module 140 from part management module 124. Part information 134 may be sent to mobile device 120 before operator 122 begins inspection of aircraft structure 104. For example, mobile device 120 may be connected to computer system 118 by a cable, such as a universal serial bus cable or some other suitable type of cable. In other illustrative examples, part information 134 may be downloaded to mobile device 120 over a wireless communications link. Part information 134 may be downloaded at any time.

In these illustrative examples, operator 122 may move mobile device 120 with respect to aircraft structure 104. Operator 122 may move mobile device 120 relative to aircraft structure 104 using location information 136.

For example, location information 136 may identify zone 142 in zones 144 for part 112. In these illustrative examples, aircraft structure 104 may be divided into zones 144. Zone 142 is an area, in which location 114 for part 112 is present. In particular, location information 136 may include information about zone 142 for aircraft 106.

Zones 144 may be defined in various ways. Zones 144 may be defined based on logical divisions, physical divisions, and/or other suitable types of factors. Zones 144 may be defined in a manner that produces areas for collecting data in aircraft structure 104. The sizes of these areas are selected to be manageable for a particular type of operation. Zones 144 may be defined during the design of aircraft 106 in these illustrative examples.

As a result, the manner in which zones 144 are defined may depend on the type of aircraft, the number of components in the aircraft, and other suitable factors. For example, zones 144 may be by part categories, general part locations, or other suitable factors. Further, zones 144 may be subdivided into sub-zones with those sub-zones being further subdivided and so on, depending on the granularity desired.

Once operator 122 reaches zone 142, location information 136 may be used to identify location 114. In particular, location information 136 may include coordinates 146 for location 114. Coordinates 146 may be used to identify location 114 in zone 142.

Further, location information 136 also may include image 148 for location 114. Image 148 may be used to provide operator 122 a visual verification of when location 114 is found. Image 148 may be a still image or an image within images 150 for a video. Images 150 may be presented rather than just image 148 by itself, depending on the particular implementation.

Operator 122 also may use image 148 to identify part 112 in location 114. In other words, image 148 also may be considered to be part of identification information 138. Image 148 may include part 112.

Once operator 122 has reached location 114, mobile device 120 may obtain part information 154 from tag 132. In these examples, part information 154 may be obtained from tag 132 using sensor system 156 in mobile device 120. In these illustrative examples, sensor system 156 may include a radio frequency identification tag reader when tag 132 is a radio frequency identification tag.

If more than one tag is present, operator 122 may point mobile device 120 in a direction towards part 112 to verify that part 112 is in location 114 and not towards another location within zone 142. Alternatively, the strength of signals generated by sensor system 156 may be reduced to obtain part information 154 from tag 132 and not from another tag within zone 142.

Sensor system 156 may include at least one of a camera, a radio frequency identifier reader, a bar code reader, a location unit, and other suitable types of sensors. Sensor system 156 is configured to generate image 160.

As used herein, the phrase "at least one of", when used with a list of items, means that different combinations of one or more of the listed items may be used and only one of each item in the list may be needed. For example, "at least one of item A, item B, and item C" may include, for example, without limitation, item A, or item A and item B. This example also may include item A, item B, and item C or item B and item C.

Image 160 may be compared with image 148 to confirm that the part at location 114 is part 112 in addition to obtaining other information.

Additionally, if visual identifier 130 can be seen, sensor system 156 may be used to read visual identifier 130 to perform a further confirmation for the presence of part 112 in location 114. Mobile device 120 may be moved to a distance from location 114 with an orientation that may reduce a possibility that other tags, in addition to tag 132, may be read by sensor system 156.

In some cases, if sensor system 156 is not used in mobile device 120, operator 122 may visually confirm that the identification information in visual identifier 130 matches information read from tag 132. This additional confirmation may reduce changes for the entry of inaccurate information. If part 112 is found in location 114, then a verification of the presence of part 112 in location 114 is generated. For example, a part may not be present at location 114, or a different part other than part 112 may be in location 114. Otherwise, communication that the part is missing from zone 142 may be generated.

This process may be performed for any number of parts in parts 108 that are to be verified as being present in particular locations. The illustration of part management environment 100 is not meant to imply physical or architectural limitations to a manner in which an advantageous embodiment may be implemented. Other components in addition to and/or in place of the ones illustrated may be used. Some components may be unnecessary. Also, the blocks are presented to illustrate some functional components. One or more of these blocks may be combined and/or divided into different blocks when implemented in an advantageous embodiment.

For example, in other illustrative examples, additional mobile devices, in addition to mobile device 120, may be present in part management environment 100 for performing inspections of aircraft structure 104. As yet another example, operator 122 has been described as a human operator. In some illustrative examples, operator 122 may be a robot, a computer-controlled arm, a mobile vehicle, or some other platform configured to move mobile device 120 relative to aircraft structure 104 to perform an inspection. With this type of example, mobile device 120 may be integrated as part of operator 122.

As another illustrative example, although platform 102 has been described with respect to an aircraft, an advantageous embodiment may be applied to other types of platforms. For example, without limitation, other advantageous embodiments may be applied to a mobile platform, a stationary platform, a land-based structure, an aquatic-based structure, a space-based structure, and/or some other suitable object. More specifically, the different advantageous embodiments may be applied to, for example, without limitation, a submarine, a bus, a personnel carrier, a tank, a train, an automobile, a spacecraft, a space station, a satellite, a surface ship, a power plant, a dam, a manufacturing facility, a building, and/or some other suitable object.

As yet another example, part management system 116 also may be used to verify the location of parts in situations other than manufacturing aircraft 106. For example, part management system 116 may be used when performing maintenance on aircraft 106. Part management system 116 may be used to verify that parts were correctly replaced in aircraft 106. As another illustrative example, part management system 116 may be used to identify a part for replacement prior to replacement of the part. This identification may be made as part of maintenance, reconfiguration, upgrade, or some other suitable type of process.

As yet another example, part management system 116 may be used to verify the location of parts when reconfiguration or upgrades are performed to aircraft 106. In still another example, part management system 116 may be used to verify the location of parts in aircraft 106 when a sale or lease of aircraft 106 occurs.

Figure 2:
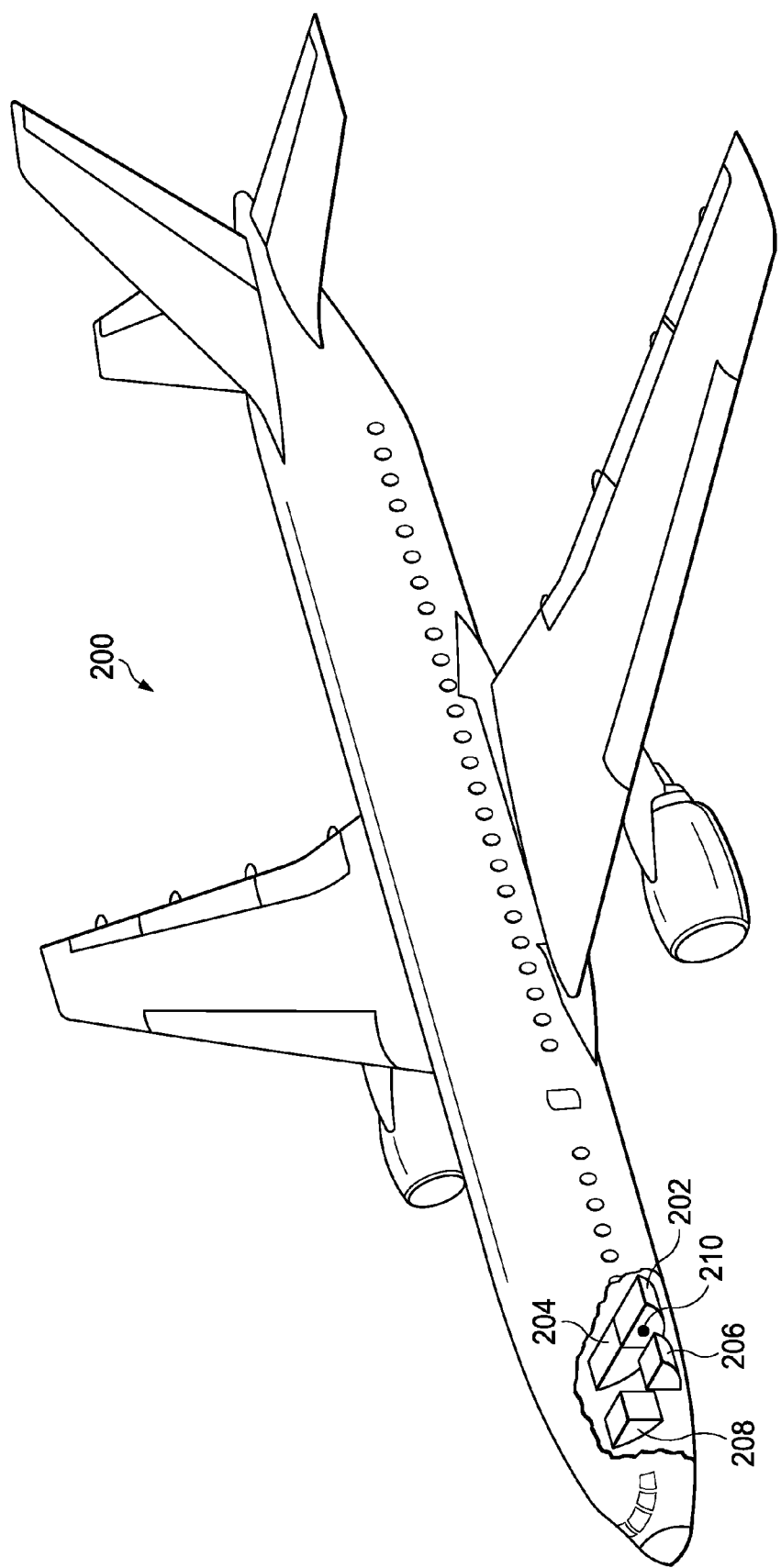
FIG. 2 is an illustration of an aircraft in accordance with an advantageous embodiment.

With reference now to FIG. 2, an illustration of an aircraft is depicted in accordance with an advantageous embodiment. In this illustrative example, aircraft 200 is an example of a physical implementation for aircraft 106 shown in block form in FIG. 1. As illustrated, zones 202, 204, 206, and 208 are illustrated within aircraft 200. These zones are zones in which equipment may be located. In this illustrative example, part 112 in FIG. 1 is to be located by an operator and is found in zone 202 in aircraft 200.

The illustration of aircraft 200 may be displayed on mobile device 120 in FIG. 1. In particular, aircraft 200 may be displayed on mobile device 120 in FIG. 1. In this manner, a three-dimensional view of a location of zone 202 may be displayed for the user in looking for a part to be identified. This part may be, for example, part 112 in FIG. 1.

For example, when aircraft 200 is displayed on mobile device 120 in FIG. 1, graphical indicator 210 may be used to identify the zone in which a part should be located. In this illustrative example, graphical indicator 210 takes the form of a dot located within zone 202.

Of course, other types of graphical indicators may be used. For example, without limitation, graphical indicator 210 may take other forms, such as color, line type, an icon, animation, shading, cross-hatching, a tool tip, or some other suitable type of graphical indicator. Graphical indicator 210 is considered to be associated with zone 202 when a viewer of graphical indicator 210 understands that graphical indicator 210 is for use in identifying or bringing attention to zone 202.

Figure 3:
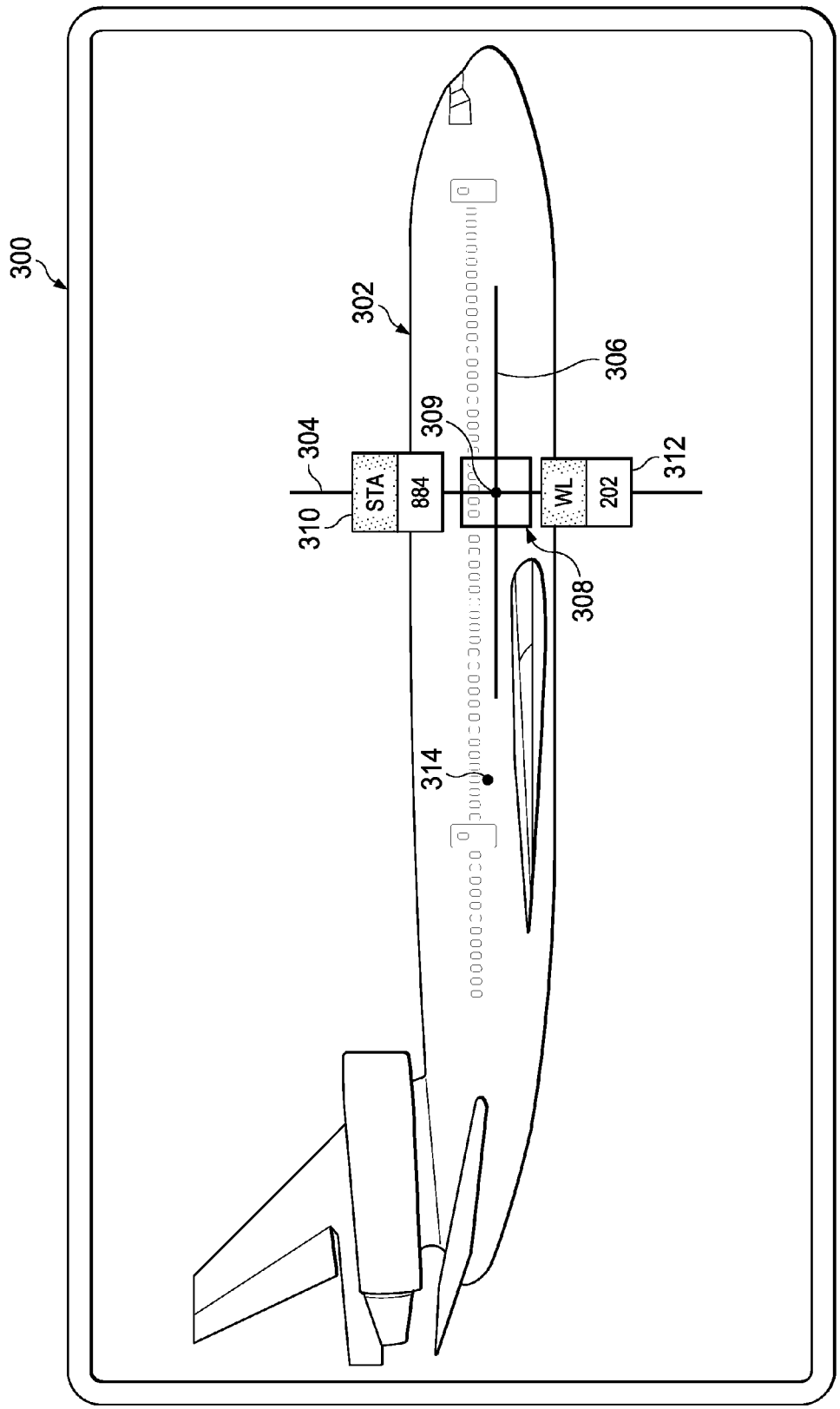
FIG. 3 is an illustration of a display of location information displayed on a mobile device in accordance with an advantageous embodiment.

With reference now to FIG. 3, an illustration of a display of location information displayed on a mobile device is depicted in accordance with an advantageous embodiment. In this illustrative example, display 300 is an example of a display that may be displayed on mobile device 120 in FIG. 1.

In this illustrative example, aircraft 302 is displayed from a cross-sectional side view. Line 304 and line 306 are displayed on aircraft 302. Line 304 and line 306 form cross-hair 308 that identifies location 309 of a part that should be verified.

In these illustrative examples, coordinate 310 and coordinate 312 are also provided. Coordinate 310 is an X coordinate, while coordinate 312 is a Z coordinate for aircraft 302. An X coordinate may also be referred to as a station line, and a Z coordinate may be referred to as a water line.

Further, in these illustrative examples, graphical indicator 314 may be displayed in display 300. Graphical indicator 314 identifies a location of the mobile device, in this illustrative example, with respect to the location to which the operator is traveling. In this manner, as operator 122 moves, operator 122 may see the location of operator 122 in FIG. 1, expressed as indicator 314, change with respect to the part at location 309.

Figure 4:
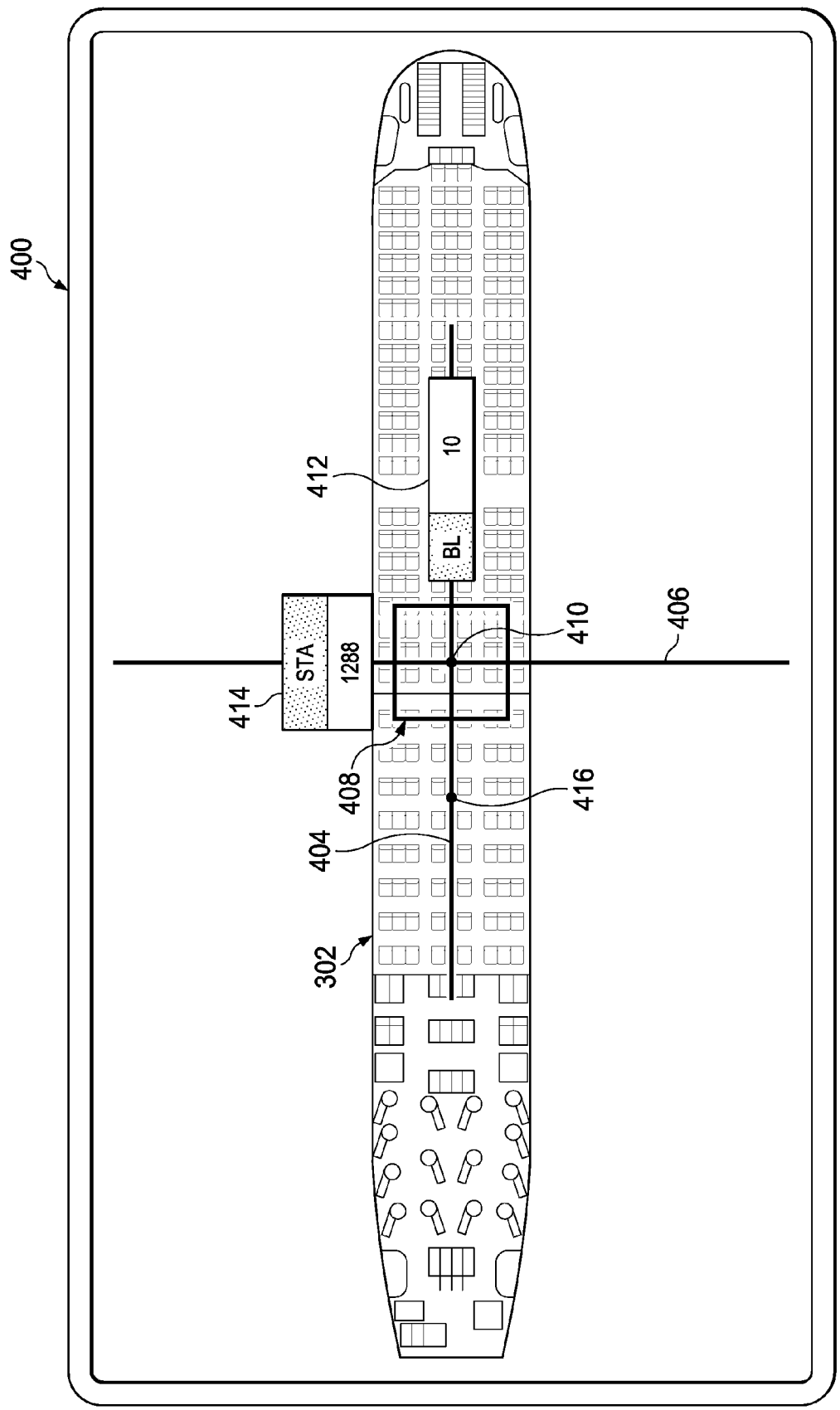
FIG. 4 is another illustration of a display of location information displayed on a mobile device in accordance with an advantageous embodiment.

With reference now to FIG. 4, another illustration of a display of location information displayed on a mobile device is depicted in accordance with an advantageous embodiment. Display 400 is an example of another display that may be displayed on mobile device 120 in FIG. 1.

In this illustrative example, a top cross-sectional view of aircraft 302 is seen in display 400. As illustrated, line 404 and line 406 form cross-hair 408. The intersection of line 404 and line 406 is location 410 of a part that is to be verified as being present in location 410 in this illustrative example.

In addition, coordinate 412 and coordinate 414 are also provided. Coordinate 412 is a Y coordinate, and coordinate 414 is an X coordinate. Coordinate 412 is also referred to as a buttock line for aircraft 302. Graphical indicator 416 is displayed in display 400. Graphical indicator 416 identifies a location of mobile device 120 in FIG. 1 relative to location 410.

As operator 122 from FIG. 1 moves, graphical indicator 416 may be updated in display 400 to identify the change in location of mobile device 120 relative to location 410.

Figure 5:
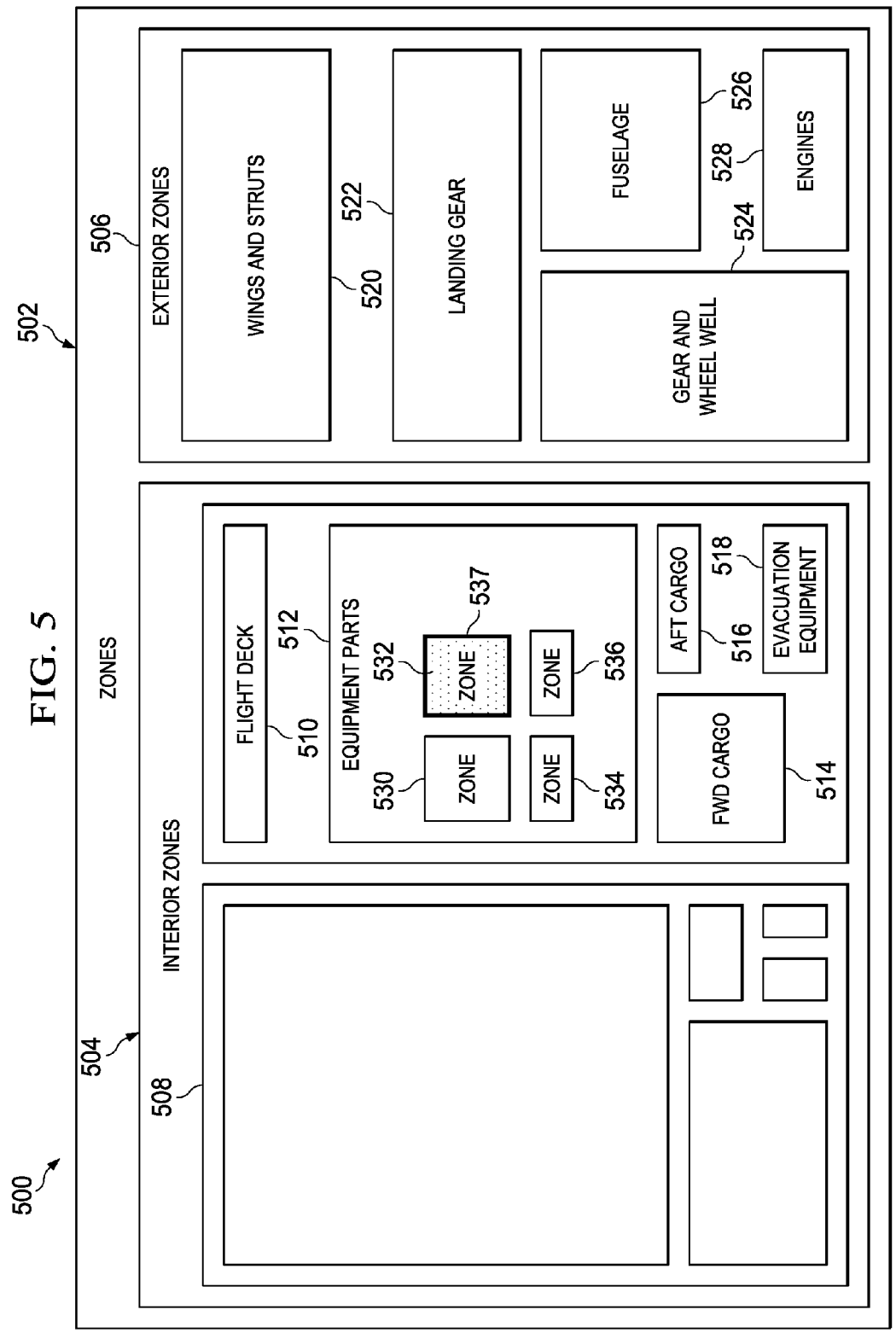
FIG. 5 is an illustration of a display of a map containing zones in accordance with an advantageous embodiment.

With reference now to FIG. 5, an example of a display of a map containing zones is depicted in accordance with an advantageous embodiment. In this illustrative example, map 500 is an illustration of zones 144 in FIG. 1. In particular, map 500 may be part of location information 136 in FIG. 1. In this depicted example, map 500 may be displayed on mobile device 120 for use by operator 122 in FIG. 1 to locate a part.

As depicted, map 500 comprises zones 502. In this example, zones 502 include interior zones 504 and exterior zones 506. Interior zones 504 include main deck 508, flight deck 510, main equipment center 512, forward cargo 514, aft cargo 516, and evacuation equipment 518. Exterior zones 506 include wings and struts 520, landing gear 522, gear and wheel well 524, fuselage 526, and engines 528.

In these illustrative examples, sub-zones may be present within zones 502. Zones 530, 532, 534 and 536 within main equipment center 512 are sub-zones for this zone. In other words, these zones are zones within main equipment center 512.

Zone 530 and zone 532 are examples of zones 202 and 204 for aircraft 200 in FIG. 2. Zones 534 and 536 are examples of zones 206 and 208 in FIG. 2. In these illustrative examples, the operator is looking for a part within zone 532 in main equipment center 512.

Map 500 is an example of one manner in which zones may be displayed on mobile device 120 in FIG. 1. In this illustrative example, if operator 122 is looking for a part that is located in zone 532 within main equipment center 512, graphical indictor 537 may be associated with zone 532. Graphical indicator 537, in this example, is a bold or thicker line. Of course, other types of graphical indicators in addition to or in place of a type of line may be used.

In this example, zone 532 represents an equipment rack. This equipment rack may have shelves that hold parts, such as line replaceable units (LRUs). The part to be located may be in a location on one of these shelves in the illustrative example.

As another illustrative example, tags may be associated with each of these zones in map 500. In this manner, operator 122 may be able to identify the zone in which operator 122 is located using sensor system 156 in mobile device 120 in FIG. 1 to read the tag in the particular zone. These tags may provide an identification of a name of the zone and its location within the aircraft.

The illustration of zones in map 500 in FIG. 5 is not meant to limit the manner in which zones may be displayed. In another illustrative example, zones may be displayed in entries in a menu rather than using map 500. Sub-zones may be displayed using sub-entries to the entries in the menu. For example, if a zone is selected, entries for sub-zones, if any, may be displayed. A selection of an entry may be made in a manner that provides location information about the zone or sub-zone in the entry that is selected. An entry for a zone or sub-zone in which a part is located may have a graphical indicator associated with the entry to identify the zone or sub-zone in which the part is located.

Figure 6:
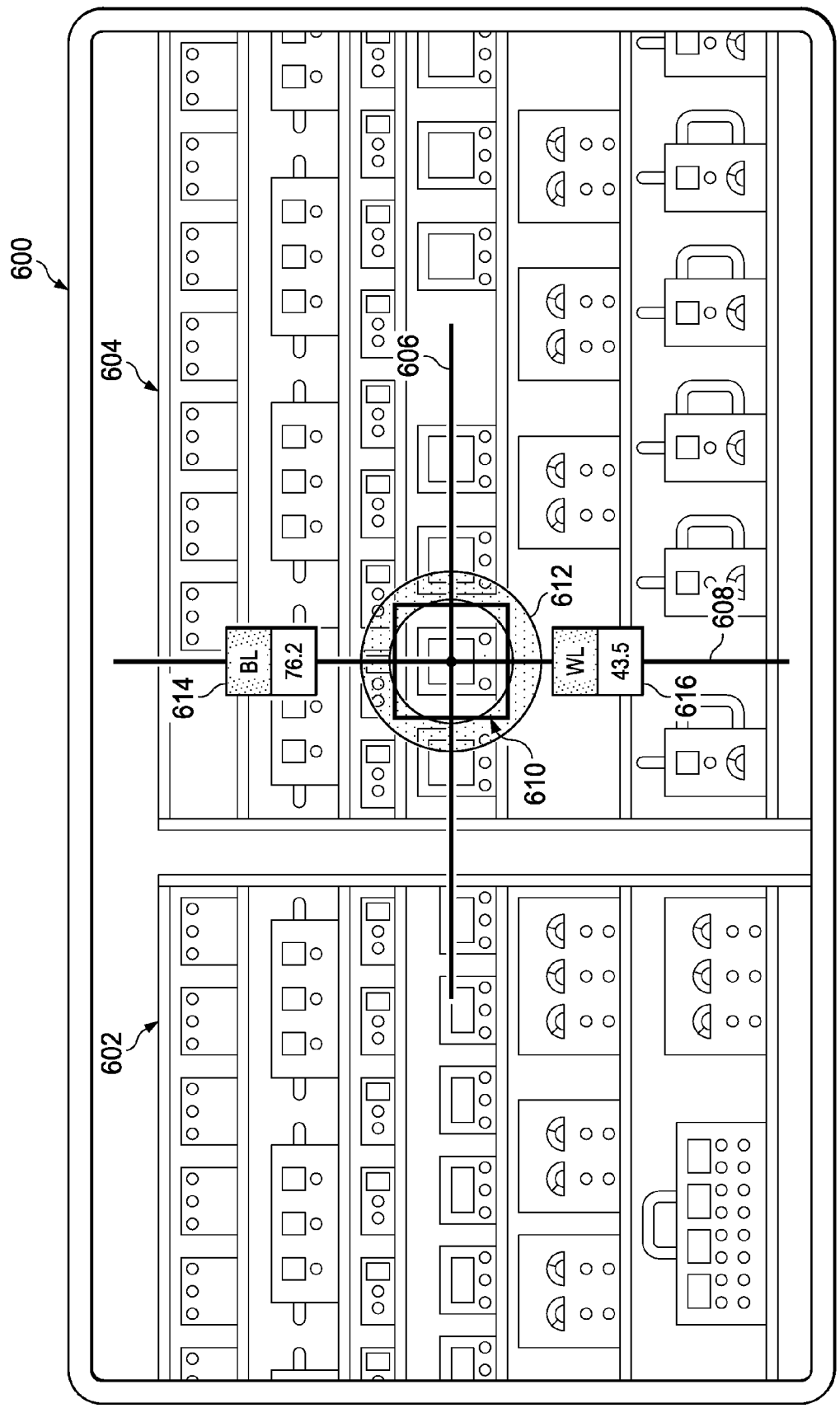
FIG. 6 is an illustration of a display of equipment in zones in accordance with an advantageous embodiment.

With reference now to FIG. 6, an illustration of a display of equipment in zones is depicted in accordance with an advantageous embodiment. Display 600 may be displayed on mobile device 120 when mobile device 120 in FIG. 1 is within main equipment center 512 in FIG. 5. Of course, display 600 may also be displayed at other times, depending on the particular implementation.

In this illustrative example, display 600 may be image 148 displayed on mobile device 120 in FIG. 1. In other illustrative examples, display 600 may be a pictorial diagram of where a part should be found.

Display 600 may be displayed on mobile device 120 in FIG. 1 when an operator reaches a zone in which a part to be identified is located. In this illustrative example, display 600 is a display of zone 530 and zone 532 in FIG. 5. As depicted, equipment rack 602 is located in zone 530 in FIG. 5, and equipment rack 604 is located in zone 532 in FIG. 5.

As depicted, line 606 and line 608 form cross-hair 610 to identify a location for a part that is to be identified by operator 122 in FIG. 1. In this illustrative example, cross-hair 610 formed by line 606 and line 608 is an example of one form of a graphical indicator. Circle 612 is another example of a graphical indicator that may be used to identify a location of a part. Additionally, coordinate 614 and coordinate 616 are also displayed in display 600 to provide additional information to locate a part.

With this identification of the location for the part to be identified, operator 122 in FIG. 1 may then obtain information from the part at that location if a part is present. If a part is present, operator 122 may use mobile device 120 in FIG. 1 to obtain information about the part from a visual identifier or a tag that is associated with the part. In particular, if a tag is present, the operator may position mobile device 120 in FIG. 1 to read the tag from the part at that location.

Figure 7:
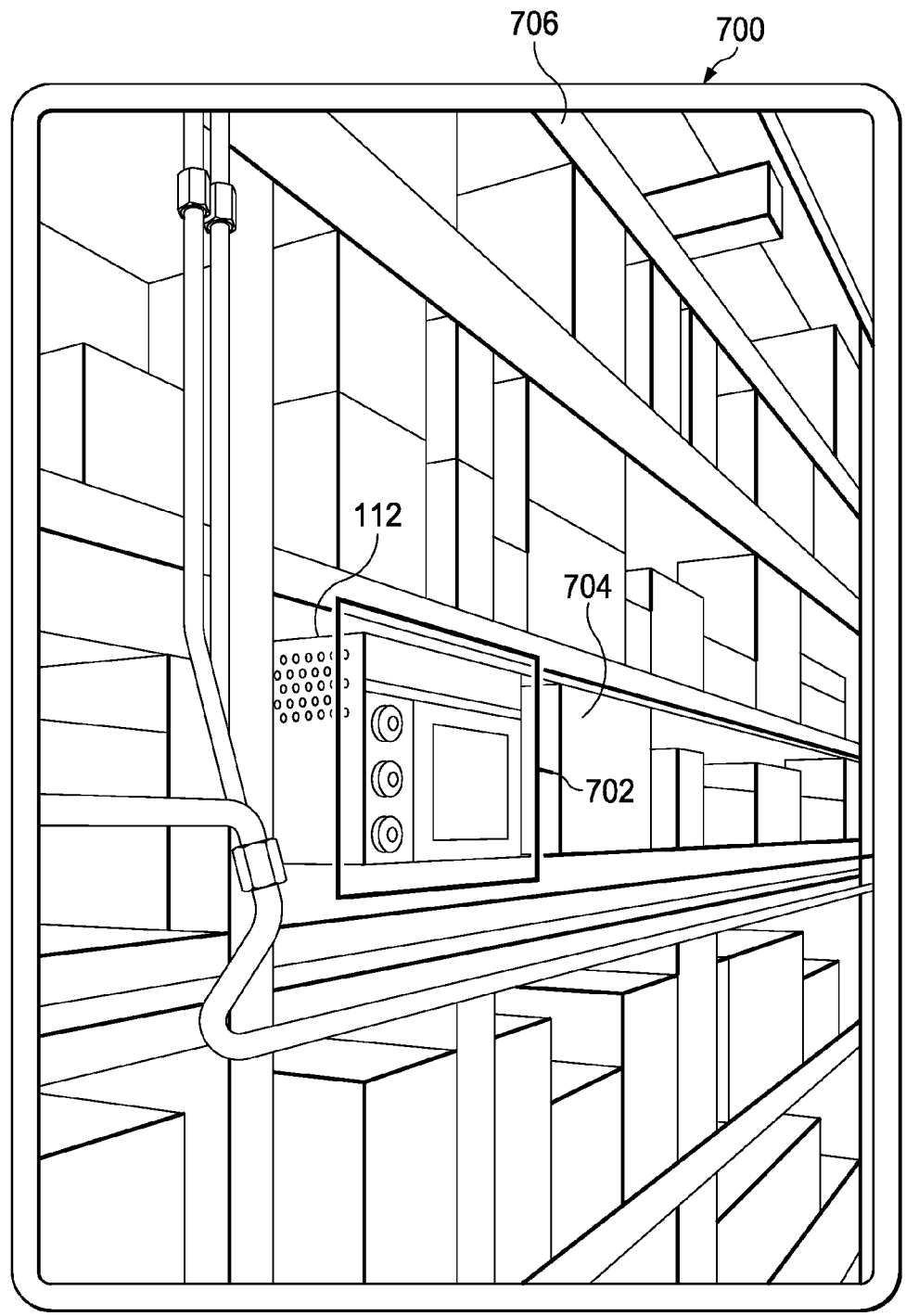
FIG. 7 is an illustration of a display of information for locating and identifying a part in accordance with an advantageous embodiment.

With reference now to FIG. 7, an illustration of a display of information for locating and identifying a part is depicted in accordance with an advantageous embodiment. In this illustrative example, display 700 is another example of a display that may be displayed on mobile device 120 in FIG. 1.

In this illustrative example, display 700 is generated by sensor system 156 in mobile device 120 in FIG. 1. In particular, display 700 may be a display of a video stream generated by sensor system 156 in mobile device 120 when operator 122 in FIG. 1 is in zone 530 in FIG. 5. In this illustrative example, mobile device 120 may augment display 700 with line 702 around part 112. Line 702 indicates that the part is the part to be verified as being a correct part in location 704 in rack 706.

Figure 8:
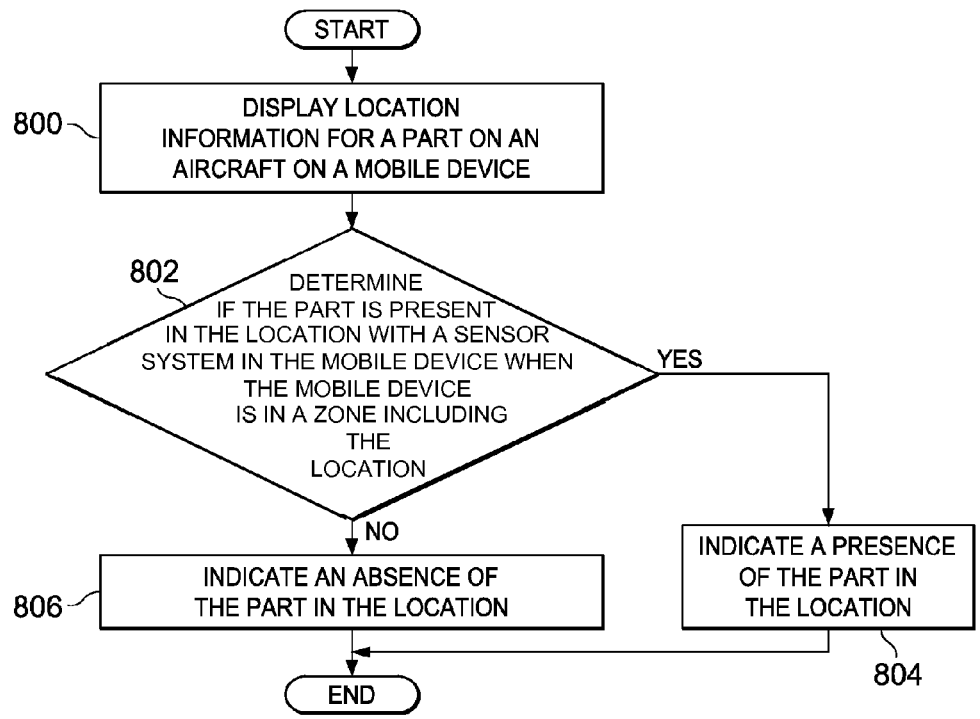
FIG. 8 is an illustration of a flowchart of a process for managing parts in accordance with an advantageous embodiment.

With reference next to FIG. 8, an illustration of a flowchart of a process for managing parts is depicted in accordance with an advantageous embodiment. The process illustrated in FIG. 8 may be implemented in part management environment 100 in FIG. 1.

In this illustrative example, the process begins by displaying location information for a part on an aircraft on a mobile device (operation 800). In this illustrative example, the location information may be displayed on a display unit in the mobile device. The process then determines whether the part is present in the location with a sensor system in the mobile device when the mobile device is in a zone including the location (operation 802).

If the part is present in the location, the process indicates a presence of the part in the location (operation 804), with the process terminating thereafter. With reference again to operation 802, if the part is not present in the location, the process then indicates an absence of the part in the location (operation 806), with the process terminating thereafter.

The indication of the presence or absence of the part may be performed in a number of different ways. For example, the indication may be an alert or message on a screen of the mobile device. The indication may be saving an entry or information in a log or other data structure regarding parts. In yet other illustrative examples, the indication of the presence or absence may be made by sending a message to a remote computer, such as a computer in computer system 118 in FIG. 1.

Figure 9:
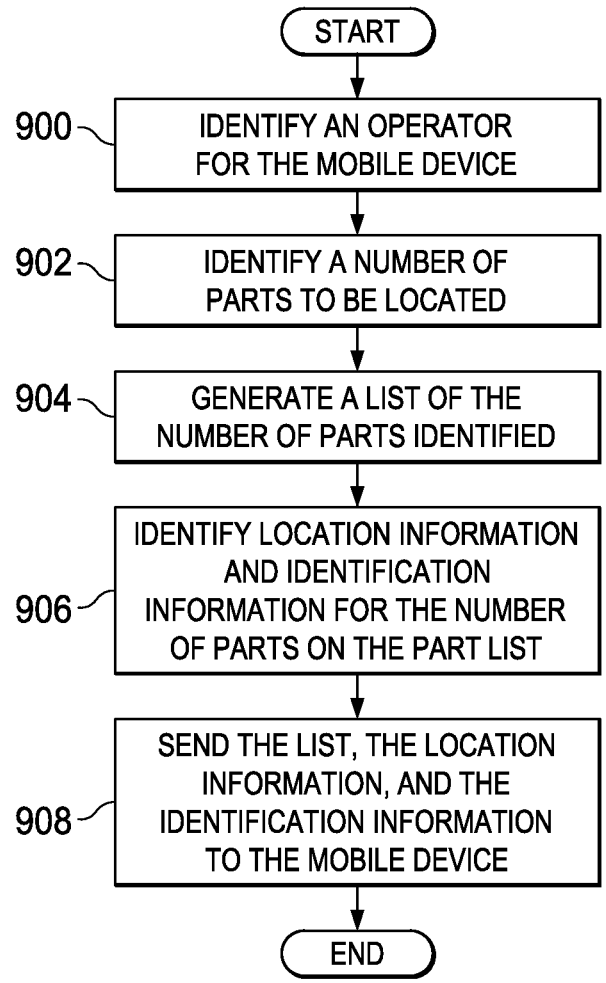
FIG. 9 is an illustration of a flowchart of a process for identifying parts to be located in accordance with an advantageous embodiment.

With reference now to FIG. 9, an illustration of a flowchart of a process for identifying parts to be located is depicted in accordance with an advantageous embodiment. The process illustrated in FIG. 9 may be implemented in part management environment 100 in FIG. 1. In particular, this process may be implemented in part management module 124 in computer system 118 in FIG. 1.

The process begins by identifying an operator for the mobile device (operation 900). This identification may be made in a number of different ways. For example, the process may identify the operator from a list or database associating operators with mobile devices. In other illustrative examples, the operator may be identified by logging into the mobile device.

The process then identifies a number of parts to be located (operation 902). These parts may be selected in a number of different ways for the operator. For example, the parts may be selected based on the zones in which the parts are located. When this type of selection is used, increased efficiency may be obtained by reducing the number of places that the operator travels to when locating and verifying the presence of parts. As another example, parts may be identified based on the type of part.

The process then generates a list of the number of parts identified (operation 904). This information may be identified from different sources. For example, the sources may include model 126 and part database 128 in part management environment 100 in FIG. 1. From these and possibly other sources, the process may identify location information and identification information for the number of parts on the part list (operation 906). The process then sends the list, the location information, and the identification information to the mobile device (operation 908), with the process terminating thereafter.

Figure 10:
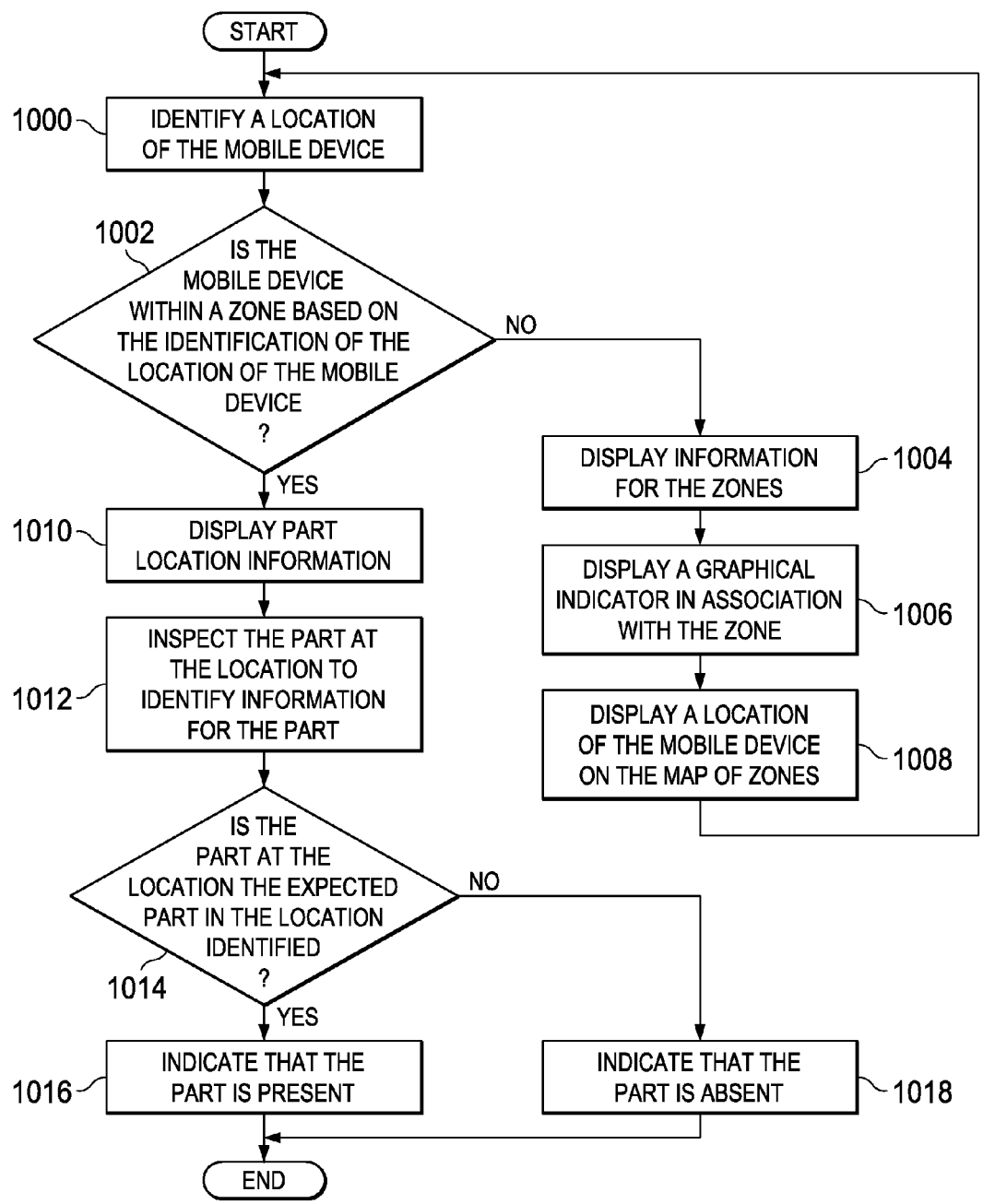
FIG. 10 is an illustration of a flowchart of a process for locating a part in accordance with an advantageous embodiment.

With reference now to FIG. 10, an illustration of a flowchart of a process for locating a part is depicted in accordance with an advantageous embodiment. The process illustrated in FIG. 10 may be implemented in part management environment 100 in FIG. 1. In particular, this process may be implemented in part identification module 140 in FIG. 1.

The process begins by identifying a location of the mobile device (operation 1000). The location of the mobile device may be identified in a number of different ways.

For example, a global positioning system may be used to generate a current location of the mobile device. In another example, the mobile device may read radio frequency identifier tags associated with different zones. These radio frequency identifier tags include identifiers for identifying a particular zone or sub-zone. In some illustrative examples, the identification of the location of the mobile device may be made through user input indicating whether the user believes that the user is within the zone in which the part is located. Of course, these and other location identification processes may be used in operation 1000.

In still other illustrative examples, the identifiers for the zones may be bar codes, name plates, and/or other suitable types of identification devices in addition to or in place of a radio frequency identifier tag and user input. Still other types of identifiers may be used, depending on the implementation.

A determination is made as to whether the mobile device is within a zone based on the identification of the location of the mobile device (operation 1002). If the mobile device is not within the zone, the process displays information for the zones (operation 1004). In these illustrative examples, the information for the zones may take various forms, such as the information in the displays described with respect to FIGS. 2-4. The process then displays a graphical indicator in association with the zone (operation 1006). In these illustrative examples, the graphical indicators may take various forms.

The process displays a location of the mobile device on the map of zones (operation 1008), with the process then returning to operation 1000. Of course, in some cases, depending on the type of map, the mobile device may not be displayed on the map of zones. For example, if the map of the zones is a logical map rather than a physical map, then the location of the mobile device may not be displayed.

With reference again to operation 1002, if the mobile device is in the zone in which the part is located, the process then displays part location information (operation 1010). This part location information may take various forms. For example, part location information may be a diagram with a physical layout of the different parts in the zone including the part to be verified. The part location information may be, for example, an image of the zone with the part or other suitable information. As an illustrative example, the part location information may be displayed in a manner described with respect to FIG. 5 and FIG. 6.

The process then inspects the part at the location to identify information for the part (operation 1012). This inspection of the part at the location may take various forms. For example, the inspection may be a visual inspection by the operator, or the inspection may be obtaining information from a radio frequency identifier tag. The information also may be obtained from a visual identifier associated with the potential part. As yet another example, this operation may include generating an image for the part at the location.

The process then determines whether the part at the location is the expected part in the location identified (operation 1014). An expected part is the part that should be at a particular location. If the part at the location is not one being looked for at that location, the part is not the expected part. Part information 134 may be used to determine if the part at the location is the expected part. This determination may be made based on the different information obtained in operation 1012 and comparing that information with part information 134.

For example, if information is obtained from a visual identifier, such as a bar code, the information may be compared with information identified for the part. As another example, if an image of the part is taken in the location, that image may be compared to images for the expected part in the part information.

If the expected part is in the location identified, the process then indicates that the part is present (operation 1016), with the process terminating thereafter. Otherwise, the process indicates that the part is absent (operation 1018), with the process also terminating thereafter. This process may be repeated for each part that is to be identified for a particular location.

Figure 11:
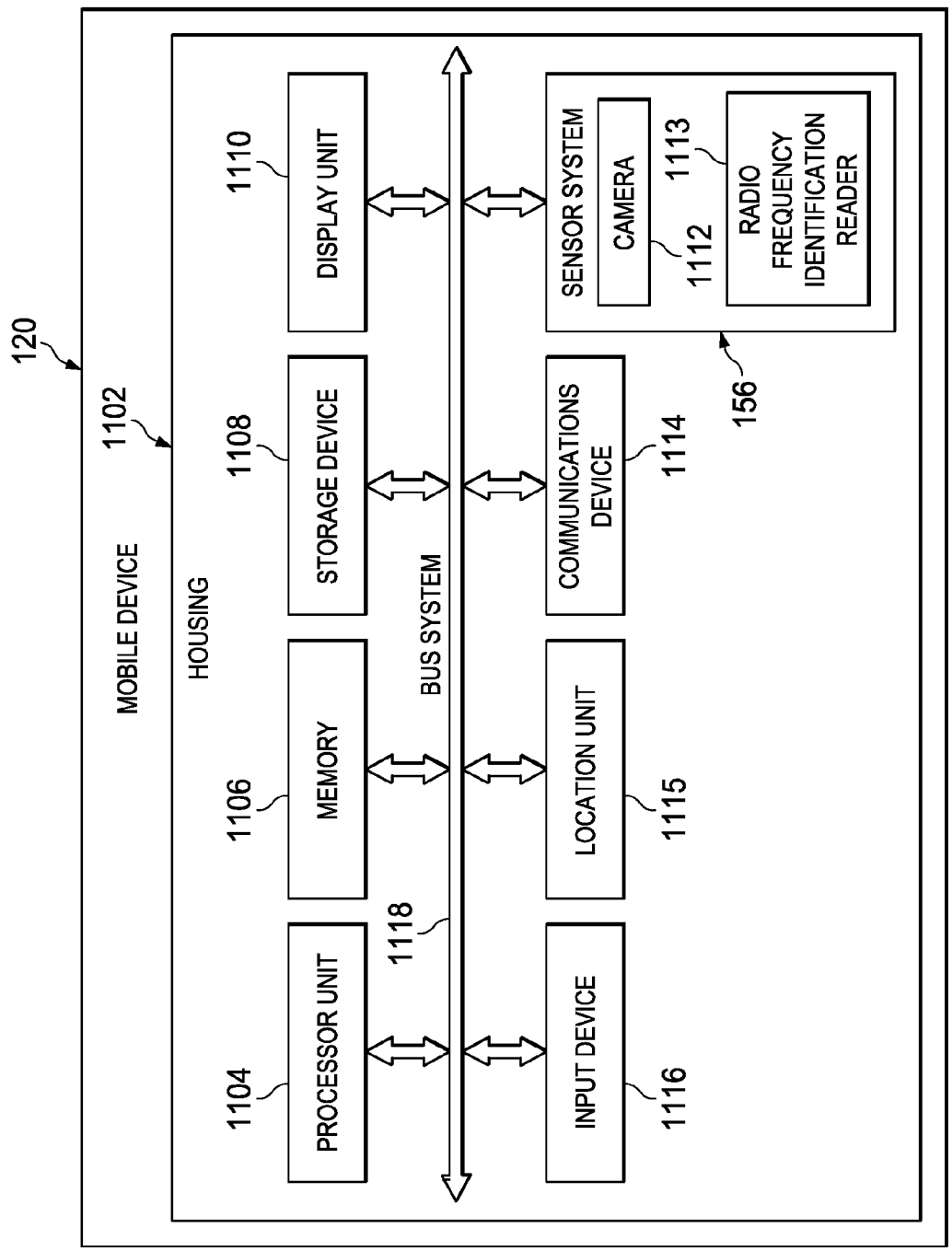
FIG. 11 is an illustration of a mobile device in accordance with an advantageous embodiment.

With reference now to FIG. 11, an illustration of a mobile device is depicted in accordance with an advantageous embodiment. Examples of components for mobile device 120 from FIG. 1 are depicted in this figure.

In this illustrative example, mobile device 120 comprises housing 1102 in which different components of mobile device 120 may be located. In this depicted example, mobile device 120 includes processor unit 1104, memory 1106, storage device 1108, display unit 1110, camera 1112, radio frequency identification reader 1113, communications device 1114, location unit 1115, and input device 1116. Bus system 1118 connects these components to each other and provides communication between the different components. In these illustrative examples, these components represent hardware components.

Part management module 124 in FIG. 1 may be implemented in mobile device 120 in these illustrative examples. When implemented as software, part management module 124 in FIG. 1 may be stored on storage device 1108 for processing by processor unit 1104 via memory 1106. When implemented as hardware, part management module 124 may be part of processor unit 1104 or a separate hardware device connected to bus system 1118 in these illustrative examples.

Processor unit 1104 is a processor similar to those used in computers, mobile phones, tablets, and other suitable types of devices. Memory 1106 is any suitable memory for storing program code, data, and other information for use by processor unit 1104. Storage device 1108 may store other information. In these examples, storage device 1108 may be a non-volatile memory, a solid state disk drive, a hard disk drive, or some other suitable type of storage device.

Display unit 1110, in these examples, is a display device configured to display information to operator 122 in FIG. 1. Display unit 1110 may be implemented using a liquid crystal display, an organic light emitting diode display, or any other suitable type of display. Camera 1112 is an example of one implementation for sensor system 156. Camera 1112 generates images.

In these examples, camera 1112 is a visible light camera. In other illustrative examples, camera 1112 may take the form of an infrared camera or some other suitable type of camera. These other types of cameras also may be used in addition to a visible light camera for camera 1112 in these depicted examples.

Communications device 1114 provides communications between mobile device 120 and bus system 1118. In these illustrative examples, communications device 1114 may be a wireless communications unit, a network interface card, a serial bus, a universal serial bus connector, or some other suitable type of unit that may be used to provide communications with a computing device, a storage device, or some other suitable hardware system.

Location unit 1115 may be used to identify a location of mobile device 120. For example, location unit 1115 may be a global positioning system receiver. With location unit 1115, mobile device 120 may provide information about its location for use in guiding operator 122 in FIG. 1 to a location for a part.

Input device 1116 is configured to receive user input. Input device 1116 may be, for example, without limitation, at least one of a keyboard, a number pad, a trackball, a touch screen on display unit 1110, or some other suitable type of input device.

The illustration of mobile device 120 in FIG. 11 is only for illustrating one manner in which mobile device 120 may be implemented. Other implementations in mobile device 120 may have other types of components in addition to and/or in place of the ones illustrated. For example, in other illustrative examples, mobile device 120 may not include location unit 1115.

Turning now to FIG. 12, an illustration of a data processing system is depicted in accordance with an advantageous embodiment. In this illustrative example, data processing system 1200 includes communications fabric 1202, which provides communications between processor unit 1204, memory 1206, persistent storage 1208, communications unit 1210, input/output (I/O) unit 1212, and display 1214. Data processing system 1200 is an example of a data processing system that may be used to implement one or more computers in computer system 118 in FIG. 1.

Processor unit 1204 serves to execute instructions for software that may be loaded into memory 1206. Processor unit 1204 may be a number of processors, a multi-processor core, or some other type of processor, depending on the particular implementation.

Memory 1206 and persistent storage 1208 are examples of storage devices 1216. A storage device is any piece of hardware that is capable of storing information, such as, for example, without limitation, data, program code in functional form, and/or other suitable information either on a temporary basis and/or a permanent basis. Storage devices 1216 may also be referred to as computer readable storage devices in these examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208.

Communications unit 1210, in these examples, provides for communications with other data processing systems or devices. In these examples, communications unit 1210 is a network interface card. Communications unit 1210 may provide communications through the use of either or both physical and wireless communications links.

Input/output unit 1212 allows for input and output of data with other devices that may be connected to data processing system 1200. For example, input/output unit 1212 may provide a connection for user input through a keyboard, a mouse, and/or some other suitable input device. Further, input/output unit 1212 may send output to a printer. Display 1214 provides a mechanism to display information to a user.

Instructions for the operating system, applications, and/or programs may be located in storage devices 1216, which are in communication with processor unit 1204 through communications fabric 1202. In these illustrative examples, the instructions are in a functional form on persistent storage 1208. These instructions may be loaded into memory 1206 for execution by processor unit 1204. The processes of the different embodiments may be performed by processor unit 1204 using computer-implemented instructions, which may be located in a memory, such as memory 1206.

These instructions are referred to as program code, computer usable program code, or computer readable program code that may be read and executed by a processor in processor unit 1204. The program code in the different embodiments may be embodied on different physical or computer readable storage media, such as memory 1206 or persistent storage 1208.

Program code 1218 is located in a functional form on computer readable media 1220 that is selectively removable and may be loaded onto or transferred to data processing system 1200 for execution by processor unit 1204. Program code 1218 and computer readable media 1220 form computer program product 1222 in these examples. In one example, computer readable media 1220 may be computer readable storage media 1224 or computer readable signal media 1226. Computer readable storage media 1224 may include, for example, an optical or magnetic disk that is inserted or placed into a drive or other device that is part of persistent storage 1208 for transfer onto a storage device, such as a hard drive, that is part of persistent storage 1208. Computer readable storage media 1224 also may take the form of a persistent storage, such as a hard drive, a thumb drive, or a flash memory, that is connected to data processing system 1200. In some instances, computer readable storage media 1224 may not be removable from data processing system 1200.

In these examples, computer readable storage media 1224 is a physical or tangible storage device used to store program code 1218 rather than a medium that propagates or transmits program code 1218. Computer readable storage media 1224 is also referred to as a computer readable tangible storage device or a computer readable physical storage device. In other words, computer readable storage media 1224 is media that can be touched by a person.

Alternatively, program code 1218 may be transferred to data processing system 1200 using computer readable signal media 1226. Computer readable signal media 1226 may be, for example, a propagated data signal containing program code 1218. For example, computer readable signal media 1226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

The different components illustrated for data processing system 1200 are not meant to provide architectural limitations to the manner in which different embodiments may be implemented. The different advantageous embodiments may be implemented in a data processing system including components in addition to or in place of those illustrated for data processing system 1200. Other components shown in FIG. 12 can be varied from the illustrative examples shown.

The different embodiments may be implemented using any hardware device or system capable of running program code. In another illustrative example, processor unit 1204 may take the form of a hardware unit that has circuits that are manufactured or configured for a particular use. This type of hardware may perform operations without needing program code to be loaded into a memory from a storage device to be configured to perform the operations.

In another example, a bus system may be used to implement communications fabric 1202 and may be comprised of one or more buses, such as a system bus or an input/output bus. Of course, the bus system may be implemented using any suitable type of architecture that provides for a transfer of data between different components or devices attached to the bus system.

Different advantageous embodiments in this disclosure may be used in a variety of potential applications. In particular, different advantageous embodiments may be used in the transportation industry including, for example, aerospace, marine, and automotive applications.

Embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an advantageous embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 may go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an advantageous embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different advantageous embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 may be fabricated or manufactured in a manner similar to components or subassemblies produced while aircraft 1400 is in service 1312 in FIG. 13. As yet another example, a number of apparatus embodiments, method embodiments, or a combination thereof may be utilized during production stages, such as component and subassembly manufacturing 1306 and system integration 1308 in FIG. 13. A number of apparatus embodiments, method embodiments, or a combination thereof may be utilized while aircraft 1400 is in service 1312 and/or during maintenance and service 1314 in FIG. 13. The use of a number of the different advantageous embodiments may substantially expedite the assembly of and/or reduce the cost of aircraft 1400.

Thus, the different advantageous embodiments provide a method and apparatus for managing parts. In particular, the different advantageous embodiments may be used to identify whether a part in a particular location in an aircraft is the part that is expected to be in that location. Location information is displayed for a part on an aircraft on a mobile device. A determination is made as to whether the part is present in the location using a sensor system in the mobile device when the mobile device is in a zone including the location. In response to a part being present in the location, a presence of the part is indicated. Otherwise, an absence of the part may be indicated.

In these illustrative examples, location information may take various forms. For example, the location information may identify zones, the location of the part within the zones, as well as possibly the location of the mobile device relative to the location where the part should be located.

The different advantageous embodiments may read tags, such as radio frequency identifier tags, when the part is located in the location. The information from the tag may be used to determine whether the part is the expected part for that location. In still other illustrative examples, the identification of the part may be made using other types of identification in addition to and/or in place of the tag. For example, visual identifiers may be used. Object recognition also may be used, in some cases, when the part may have a unique shape or may be the only part of that type present in the aircraft.

With one or more of the different advantageous embodiments, the amount of time needed to identify parts in different locations may be made more quickly than with currently used systems. In particular, the different advantageous embodiments may be especially useful when an operator looking for a part is inexperienced or working with a new aircraft or vehicle.

The description of the present invention has been presented for purposes of illustration and description and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for managing parts, the method comprising:
displaying location information for a part on an aircraft on a mobile device;
determining whether the part is present in a location using a sensor system in the mobile device when the mobile device is in a zone including the location, the sensor system comprising a radio frequency identifier reader and a second type of sensor, the determining comprising:
obtaining information from a radio frequency identifier tag;
determining whether the information is for the part; and
performing a further confirmation for presence of the part in the location using the second type of sensor; and
responsive to the part being present in the location, indicating a presence of the part in the location.

2. The method of claim 1 further comprising:
responsive to the part being absent from the location, indicating an absence of the part in the location.

3. The method of claim 1, wherein displaying the location information for the part on the aircraft comprises:
displaying a diagram identifying a zone in the aircraft in which the part is located.

4. The method of claim 3, wherein displaying the location information for the part on the aircraft further comprises:
displaying a location of the mobile device relative to the part in the aircraft.

5. The method of claim 3, wherein displaying the location information for the part on the aircraft further comprises:
displaying at least one image of the zone.

6. The method claim 5, wherein the image of the zone is displayed when the mobile device is located in the zone.

7. The method of claim 5, wherein displaying the at least one image of the zone comprises:
displaying at least one of a still image of the zone and at least one image of a plurality of images for a video of the zone with a visual identifier identifying the part in the at least one of the still image and the at least one image for the video.

8. The method of claim 1, wherein obtaining the information from the tag comprises:
positioning the mobile device relative to the location such that the information is obtained from the tag in the location.

9. An apparatus comprising:
a mobile device configured to display location information for a part on an aircraft on the mobile device; determine whether the part is present in a location using a sensor system in the mobile device when the mobile device is in a zone including the location, the sensor system comprising a radio frequency identifier reader and a second type of sensor, the determining comprising obtaining information from a radio frequency identifier tag, determining whether the information is for the part, and performing a further confirmation for presence of the part in the location using the second type of sensor; and indicate a presence of the part in the location in response to the part being present in the location.

10. The apparatus of claim 9, wherein the mobile device is configured to be responsive to the part being absent from the location.

11. The apparatus of claim 9, wherein in being configured to display the location information for the part on the aircraft, the mobile device is configured to display a diagram identifying a zone in the aircraft in which the part is located.

12. The apparatus of claim 11, wherein in being configured to display the location information for the part on the aircraft, the mobile device is further configured to display a location of the mobile device relative to the part in the aircraft.

13. The apparatus of claim 11, wherein in being configured to display the location information for the part on the aircraft, the mobile device is further configured to display at least one image of the zone.

14. The apparatus of claim 13, wherein the image of the zone is displayed when the mobile device is located in the zone.

15. The apparatus of claim 13, wherein in being configured to display the at least one image of the zone, the mobile device is configured to display at least one of a still image of the zone and at least one image of a plurality of images for a video of the zone with a visual identifier identifying the part in the at least one of the still image and the at least one image for the video.

16. The apparatus of claim 9 further comprising:
a computer system, wherein the computer system is configured to identify a number of parts to be located, create a list of the number of parts, identify location information and identification information for the number of parts, and send the list of the number of parts, the location information for the number of parts, and the identification information for the number of parts to the mobile device.

* * * * *